No. 887,555. PATENTED MAY 12, 1908.
H. C. WALLACE.
BUNDLE STRAIGHTENER FOR THRESHING MACHINES.
APPLICATION FILED MAR. 16, 1906.

2 SHEETS—SHEET 1.

Inventor
H. C. Wallace,

Witnesses
Jno. Robb
W. N. Woodson

By
R. W. B. Lacey, Attorney

No. 887,555. PATENTED MAY 12, 1908.
H. C. WALLACE.
BUNDLE STRAIGHTENER FOR THRESHING MACHINES.
APPLICATION FILED MAR. 16, 1906.

2 SHEETS—SHEET 2.

Witnesses

Inventor
H. C. Wallace,
By Attorneys

UNITED STATES PATENT OFFICE.

HALBERT C. WALLACE, OF McPHERSON, KANSAS.

BUNDLE-STRAIGHTENER FOR THRESHING-MACHINES.

No. 887,555.  Specification of Letters Patent.  Patented May 12, 1908.

Application filed March 16, 1906. Serial No. 306,481.

*To all whom it may concern:*

Be it known that I, HALBERT C. WALLACE, citizen of the United States, residing at McPherson, in the county of McPherson and State of Kansas, have invented certain new and useful Improvements in Bundle-Straighteners for Threshing-Machines, of which the following is a specification.

This invention has for its object a simple and novel device for use in connection with self feeders of threshing machines to insure that the bundles of grain or other threshable product shall be straightened out and fed endwise to the concaves of the threshing cylinder.

Figure 1:
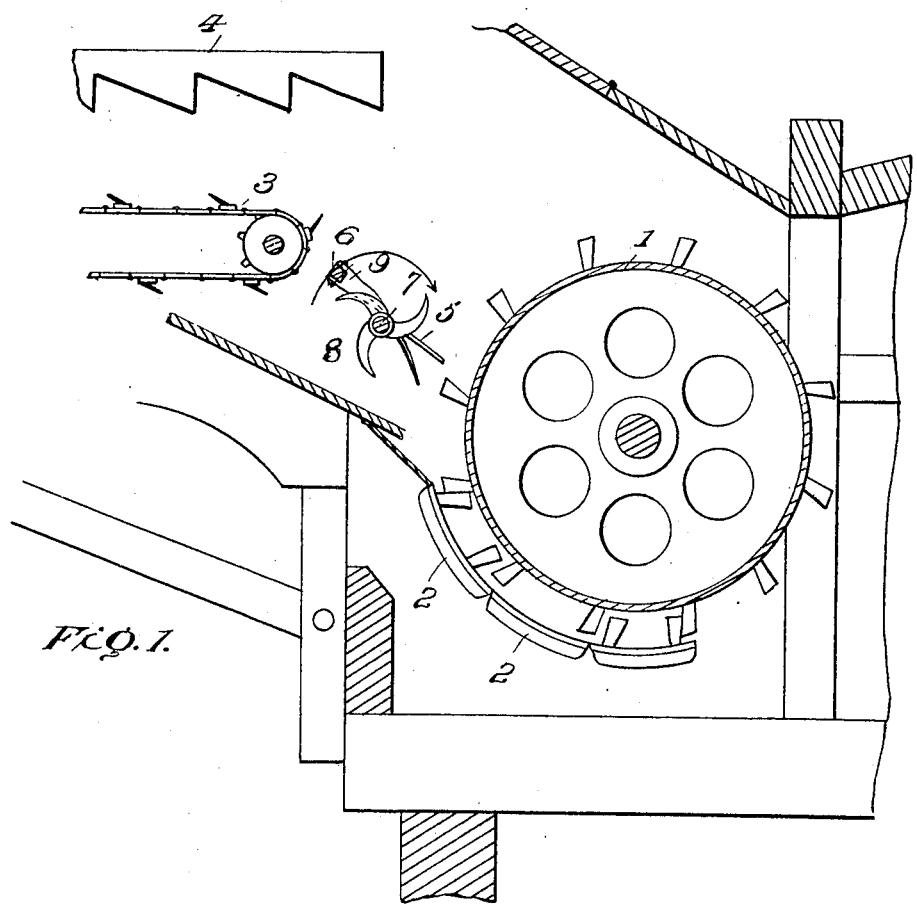
Figure 2:
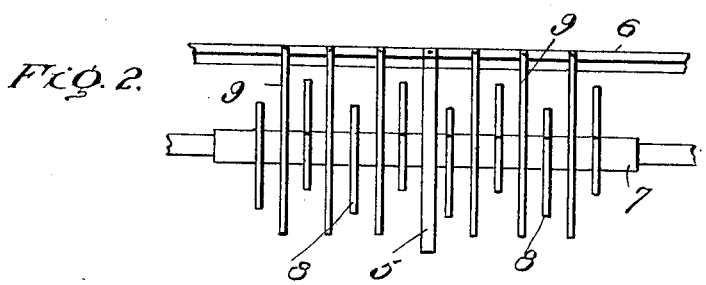
Figure 3:
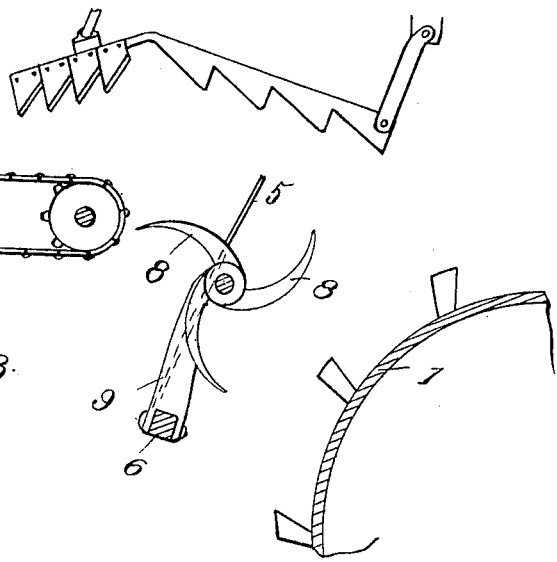
Figure 4:
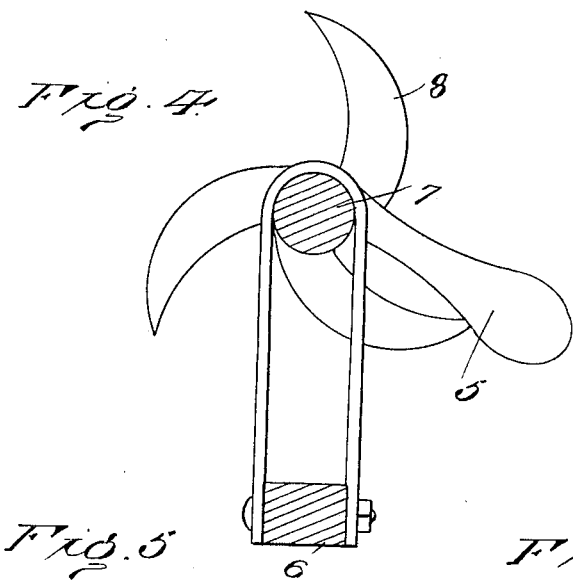
Figure 5:
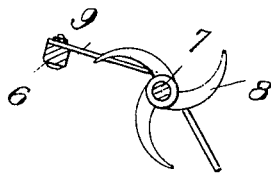
Figure 6:
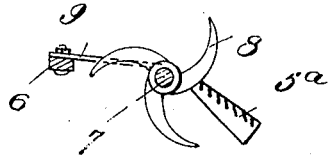

For a full understanding of the invention reference is to be had to the following description and accompanying drawings, in which:

Figure 1 is a vertical sectional view, partially broken away, showing the delivery end of a feeder in connection with suitable threshing mechanism, the strippers, shown in Fig. 5, being omitted in this view. Fig. 2 is a broken top plan view showing the arrangement of the strippers, my improved straightening bar, and the retarding or regulating fingers. Fig. 3 is a view embodying the new modification of the invention, parts being broken away but in proper relative position. Fig. 4 is a sectional view embodying a modification of the strippers and straightening bar, and; Figs. 5 and 6 illustrate further modifications of the construction of the straightening bar.

Corresponding and like parts are referred to in the following description and indicated in all the views of the accompanying drawings by the same reference characters.

Referring to the drawings, the numeral 1 designates the threshing cylinder, 2 the concaves, 3 any approved form of feeder, and 4 the usual band knives for severing the bands securing the bundles of grain fed to the threshing mechanism by the feeder.

My improved means for insuring that the bundles shall be fed endwise between the threshing cylinder and concaves comprises a bar 5 which is secured to a transverse beam 6, the ends of said beam being substantially attached to opposite sides of the feeder in any desired way. The straightening bar 5 projects from the beam 6 towards the threshing cylinder 1, and extends over the shaft 7 that is customarily provided at the delivery end of the feeder and carrying a plurality of retarding or regulating fingers 8 that are driven in any desired way (not shown) and turned in the direction of the dart in Fig. 1.

The straightening bar 5 is preferably located midway of the space of the sides of the feeder and it extends beyond and in a higher plane than the strippers 9 that are also secured to the beam 6 and which are designed to prevent the grain from winding about the shaft of the regulating or retarding mechanism.

The bundle straightening bar 5 may be of different forms and may be arranged in different ways between the delivery end of the feeder and the threshing cylinder, and Fig. 3 illustrates a modification wherein the bar is in an approximately perpendicular position. If desired the bar may extend upwardly between the band knives, and the latter and the retarding fingers 8 will coact in forcing the grain past the straightening bar 5 to one side or the other, so as to insure that the bundles shall be fed endwise in between the threshing cylinder and concaves. With that arrangement of parts illustrated in Fig. 3, the beam to which the straightening bar is fastened is located below the shaft 7 of the retarding fingers, in contradistinction to its location in Fig. 1 where it is at one side of said shaft.

Fig. 6 illustrates a further modification of the invention in which the edge 5ª of the straightening bar is serrated or otherwise roughened, so that it will assist in severing the bands of the bundles. In every instance, however it will be seen that the straightening bar 5 is disposed in a higher plane than the series of strippers, so that as the retarding fingers rotate, they will force the bundle of grain upwardly and forwardly and cause it to tilt to one side or the other upon the straightening bar 5, so that as it is caught by the threshing cylinder it will be dragged thereby toward the concaves, and the retarding effect of the straightening bar that is a higher plane than the strippers, will cause the bundle to be turned and fed endwise in between the threshing cylinder and concaves.

Having thus described the invention, what is claimed as new is:

The combination with threshing mechanism embodying the threshing cylinder, and means for feeding the grain to the cylinder, of a series of retarding fingers between the feeding means and said cylinder, a shaft upon which said retarding fingers are mounted, a transversely extending beam mounted between the feeding means and the cylinder, a series of strippers secured to said beam and extending to the shaft and designed to prevent the said shaft from being wrapped with the grain, and also designed to prevent the grain from being dragged back in the feeding means, and a stationary bundle straightening bar secured to said beam and extending therefrom across the shaft in a higher plane than the said strippers, said bar being located at an intermediate point in the series of strippers.

In testimony whereof I affix my signature in presence of two witnesses.

HALBERT C. WALLACE. [L. S.]

Witnesses
 THOS. C. SAWYER,
 W. C. WALLACE.